May 12, 1959     I. E. ASKE     2,886,301
HYDRAULIC WEIGHING SCALE
Filed Sept. 24, 1954     3 Sheets-Sheet 1
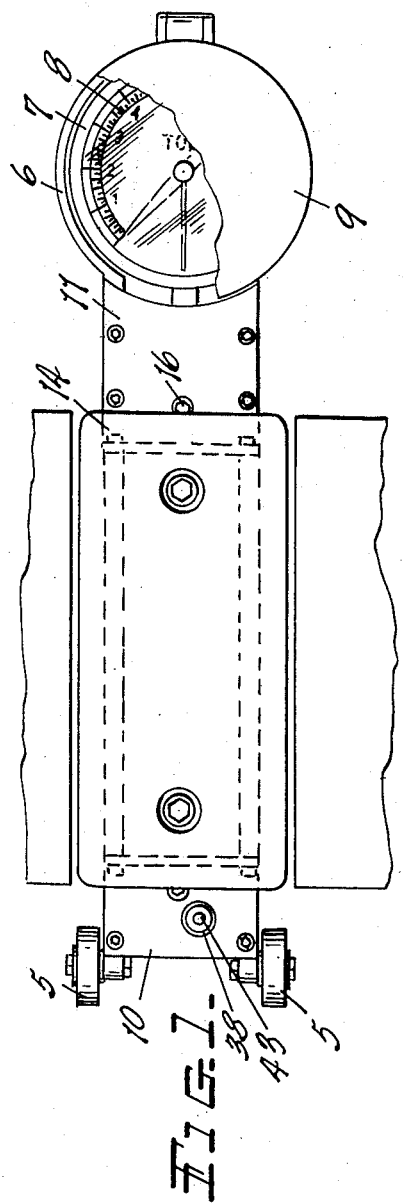
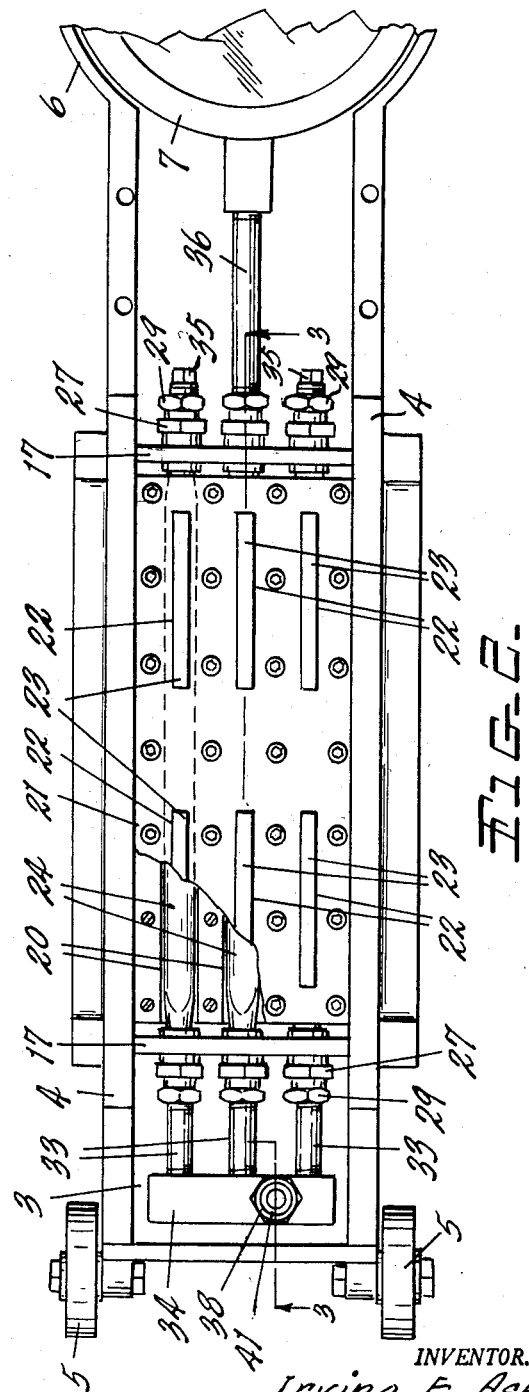
INVENTOR.
Irving E. Aske
BY Otis A. Earl
Attorney.

May 12, 1959
I. E. ASKE
2,886,301
HYDRAULIC WEIGHING SCALE
Filed Sept. 24, 1954
3 Sheets-Sheet 2
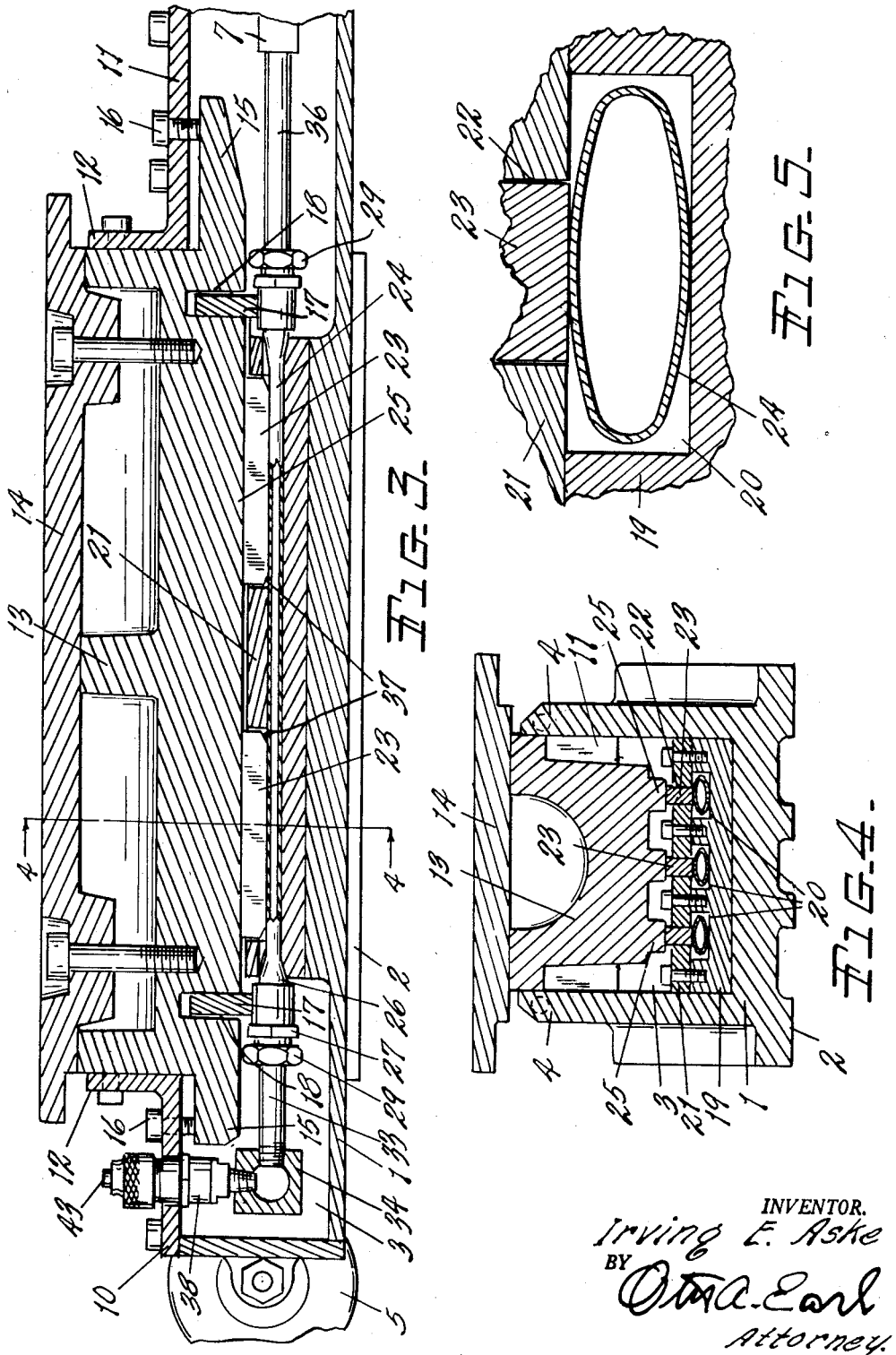
INVENTOR.
Irving E. Aske
BY
Otma C. Earl
Attorney.

May 12, 1959     I. E. ASKE     2,886,301
HYDRAULIC WEIGHING SCALE
Filed Sept. 24, 1954     3 Sheets-Sheet 3

INVENTOR.
Irving E. Aske
BY
Otis A. Earl
Attorney.

United States Patent Office 2,886,301
Patented May 12, 1959

2,886,301

HYDRAULIC WEIGHING SCALE

Irving E. Aske, St. Petersburg, Fla.

Application September 24, 1954, Serial No. 458,149

22 Claims. (Cl. 265—47)

This invention relates to improvements in hydraulic weighing scale. This application is a continuation in part of my copending application Serial No. 303,752, filed August 11, 1952 for Hydraulic Scale. The principal objects of this invention are:

First, to provide a hydraulic weighing scale which is extremely accurate and stable in that it will remain accurate under varying temperatures and atmospheric conditions.

Second, to provide a hydraulic scale the elements of which do not deteriorate with age and which are not objectionably displaced under load to vary the calibration of the scale.

Third, to provide a hydraulic weighing scale with a fluid reservoir and manually operable valve for releasing pressure created by expansion of the fluid in the scale.

Fourth, to provide a novel form of load sustaining and liquid retaining member for a hydraulic scale which will consistently and uniformly translate applied loads into hydraulic pressures proportional to the applied load.

Fifth, to provide a fluid retaining flexible diaphragm member of substantially non-resilient material so that deflection of the diaphragm member caused by the application of a load thereto will apply the full load to the retained body of fluid without supporting any substantial portion of the load by resilient movement of the diaphragm.

Sixth, to provide a metallic tubular diaphragm and couplings for the ends thereof which will permit the diaphragm to be connected in a closed hydraulic system for the creation of hydraulic pressures in the system proportional to loads applied to the diaphragm.

Seventh, to provide a tubular metallic diaphragm having flattened oval cross section of greater width than thickness adapted to create a maximum displacement of fluid in the diaphragm with a minimum deflection of the wide walls of the diaphragm and without creating any substantial stress in the walls of the diaphragm.

Eighth, to provide a light relatively inexpensive scale capable of accurately weighing loads of ten tons or more, which scale is portable and needs no fixed installation for accurate operation.

Other objects and advantages of the invention will be apparent from a consideration of the following description and claims.

Fig. 1 is a plan view of a scale embodying the invention.

Fig. 2 is a fragmentary enlarged plan view of the scale with the cover and load carrying portions thereof removed and with a portion of the pressure member broken away.

Fig. 3 is a vertical longitudinal cross sectional view through the scale taken along the plane of the line 3—3 in Fig. 2.

Fig. 4 is a vertical transverse cross sectional view taken along the plane of line 4—4 in Fig. 3.

Fig. 5 is a fragmentary enlarged transverse cross sectional view through one of the load supporting diaphragms and pressure bars of the scale.

Figure 6:
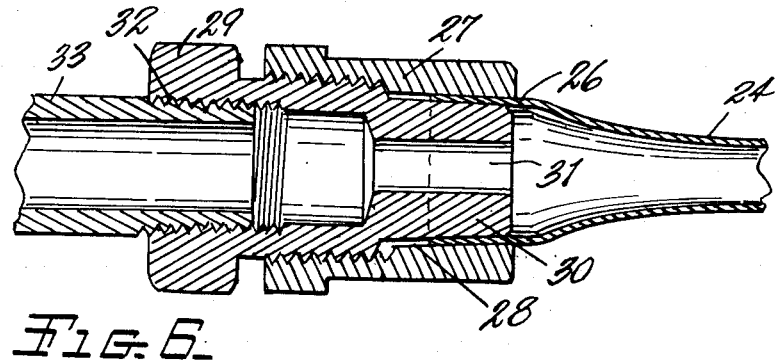
Fig. 6 is an enlarged fragmentary longitudinal cross sectional view through one of the couplings at the ends of the load supporting diaphragms of the scale.

In my copending application referred to above there is disclosed a hydraulic scale similar to the present scale but using a rubber or resiliently deformable tubular diaphragm for enclosing a body of liquid which supports the load by hydraulic pressure in the diaphragm. In principle of operation, the prior scale is the same as the present scale in that the pressure created in the diaphragms is a function to the applied load divided by the effective area of application of the load to the diaphragm.

The present scale is similar in many structural respects to the prior scale and includes a chambered base 1 having a flat under surface 2 adapted to rest on the floor or ground. The base has side walls 3 which are extended upward as at 4 along the midportion of the base. Wheels 5 for moving the scale are mounted on one end of the base while the other end is formed into a circular housing 6 for a hydraulic pressure gage 7 having a dial calibrated in thousands of pounds as at 8. Desirably a gage cover 9 is provided to protect the gage. As in the prior application, the gage 7 is of a constant volume type in which the volume of liquid in the gage does not vary with the pressure applied.

Secured to the top of the base at each end of the raised side walls 4 are angled top plates 10 and 11 having upstanding flanges 12 that are secured to and close the ends of the upstanding portions of the side walls. Vertically slidably and guidingly mounted in the recess defined by the side walls 4 and flanges 12 is a load member 13 desirably formed as a casting and having a deck plate 14 secured to the top thereof and projecting over the side walls 4. The ends of the load member 13 have longitudinally projecting ears 15 thereon which underlie the top plates 10 and 11. Screws 16 are threaded through the top plates to adjustably limit upward movement of the pressure member and to prevent tilting of the pressure member in case a load is applied eccentrically to one end of the deck plate. Brace bars 17 extend transversely between the ends of the side walls 4 to prevent the side walls from being deflected into gripping engagement with the pressure member and the bottom of the pressure member is transversely slotted as at 18 to clear the brace bars 17.

Positioned in the bottom of the base below the pressure member 13 is a bottom plate 19 having three upwardly opening slots 20 formed longitudinally therethrough. The bottom plate 19 fits snugly but removably between the side walls 3 of the base. Securely clamped to the top of the plate 19 and projecting over the slots 20 is a retaining plate 21. The plate 21 has a plurality of longitudinally extending slots 22 formed therein with two slots spaced longitudinally over each of the grooves 20. The slots 22 slidably and guidingly receive a plurality of pressure bars 23 which project above the retaining plate 21. The pressure bars are supported on the bottom by flexible tubular diaphragms 24 positioned one in each of the grooves 20. The top of the pressure bars 23 engage and support rails 25 formed longitudinally along the bottom of the pressure member 13.

The tubular diaphragms 24 are important to the accuracy and stable functioning of the scale. It has been found that thin walled stainless steel tubing is very satisfactory for the formation of the tubular diaphragms. A wall thickness of one sixty-fourth of an inch is satisfactory for scales of ten ton capacity. The tubes are formed as illustrated into a flattened oval cross section that is substantially wider than it is thick. Desirably the width of the tube is at least three times its thickness. It is desirable that the sharp side edges of the tube be as sharp as possible. It is further essential at least one and preferably both the top and bottom walls of the tube be convex as illustrated. The tube cross section is not necessarily a true ellipse. Tubes having a side wall radius of one sixteenth of an inch and top and bottom radii of one inch on the inside have proved satisfactory in scales for weighing loads of ten tons or more. It will be noted that the grooves 20 in the bottom plate are substantially wider than the tubes so that the side edges of the tubes are not restrained in any way. The retaining plate 21 engages the tops of the tubes beyond the ends of the pressure bars to restrain any tendency of the tubes to expand upwardly under hydraulic pressure.

When the tubular diaphragms are filled with oil as will be disclosed and when the load member 13 and pressure bars 23 are pressed downwardly against the tubes by the application of a load to the scale the initial line contact between the pressure bars and the tubes and between the bottoms of the tubes and the bottoms of the grooves 20 will be rapidly and immediately broadened into a wider area contact. The very slight vertical deflection of the top and bottom walls of the tube is accommodated by very slight outward movement of the side edges of the tube and by flexing at the small side radius of the tube without creating any substantial stress in the wall of the tube and without causing any substantial resilient displacement of the material in the tube walls. At the same time this small deflection of the diaphragm tube will displace a relatively substantial amount of the oil in the tubes. That is, the cross section illustrated results in maximum displacement with a minimum vertical movement of the pressure bars 23. The actual displacement in terms of volume is relatively small but is sufficient to cause complete compression of the relatively incompressible oil in the diaphragms. The pressure bars and load members are thereafter supported entirely on a compressed body of oil so that the pressure created in the oil or liquid is proportional to the applied load. It is contemplated that the screws 16 will be tightened down on the ears 15 of the pressure member to effect initial deflection of the tubes but this is not essential.

Figures 7, 8:
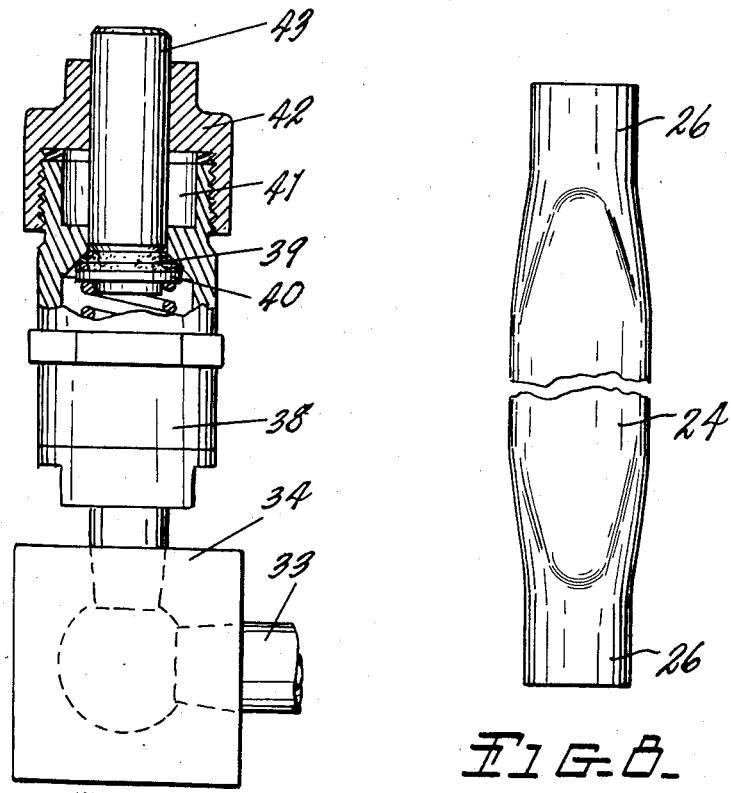
Fig. 7 is a fragmentary vertical cross sectional view through the header and pressure equalizing reservoir of the scale.
Fig. 8 is an enlarged fragmentary detailed view of one of the load supporting diaphragms of the scale.

In order to retain the hydraulic fluid in the tubular diaphragms and to register the pressure in the fluid the tubes 24 have generally cylindrical end portions 26 (see Figs. 6 and 8). These end portions 26 are fitted within internally threaded coupling members 27 having tapered bores 28 at their inner ends. Externally threaded inner coupling members 29 are threaded into the members 27 and provided with tapered plugs 30 that extend into the ends of the tubes and clampingly seal the ends of tubes. The plugs 30 are internally bored at 31 and threaded as at 32 to afford communication between the tube and the connecting pipe 33.

At the left end of the scale as viewed in the drawings the tubes 24 and their connecting pipes 33 are all connected to a common header 34 that interconnects the several tubes. At the opposite end of the scale the couplings 29 of two of the tubes are closed by plugs 35 and the third coupling is connected by a pipe 36 to the pressure gage 7.

The entire system including the pressure gage 7, tubular diaphragms 24 and the connecting pipes and manifold are completely filled with a liquid having a relatively low coefficient of expansion. Various silicone oils are suitable for this purpose. The scale is calibrated upon assembly by applying a known load to the pressure member and checking readings on the dial 8 against the known load. If the dial reading is high the slots 22 in the retaining plate are lengthened to accommodate somewhat longer pressure bars to distribute the load over a greater length and area of the tubular diaphragms. If the dial reading is low the pressure bars 23 are shortened. After the dimensions for a scale of any given capacity have once been determined they can, of course, be fairly closely reproduced and final calibration of each scale can be effected by slightly dressing off the ends of the pressure bars as at 37 in Fig. 3.

Since there may be some overall expansion on the body of hydraulic liquid in the scale when the temperature of the scale varies between low winter and high summer temperatures a scale calibrated at low temperature may show an initial false reading at high temperatures if the liquid expands sufficiently to press the pressure member 13 against the limit screws 16. In order to relieve this initial pressure and false reading the manifold 34 is provided with an upstanding relief valve 38. This valve is shown in detail in Fig. 7 and consists of a body member externally threaded at the top and provided with a downwardly facing internal seat 39. A spring pressed valve 40 normally seats against the seat 39 and the body of the valve is filled with liquid along with the rest of the scale system. Upwardly from the valve seat 39 there is provided a small reservoir space 41 which is closed by a screw cap 42. The cap 42 is bored to receive the manually operated plunger 43 which functions to depress the valve 40 and permits excess oil to escape from the scale system into the reservoir. Desirably an excess of oil is maintained in the reservoir to prevent air being sucked into the system after the valve is opened after a substantial fall in temperature has created a slight vacuum in the scale system. The reservoir 41 and valve 40 permit the scale to be operated at all times at a pressure equalized with the atmospheric pressure. It is pointed out that a slight vacuum in the scale system would not interfere with the accuracy of the scale but would only result in slightly greater deflection of the diaphragms and slightly greater movement of the load member to fully compress the oil.

For the purpose of definition as used in the claims the terms "resilient" and "elastic" are intended to denote the characteristic or property of an object or material which enables it to return quickly and completely to its original shape and state after being subjected to a stress and load and after the stress and load are removed. The term "non-expansible" is intended to denote the relative inability of the defined material to flow or stretch or be displaced, after the manner of rubber, along lines other than the lines of applied loads.

Having thus described the invention what is claimed to be new and what is desired to be secured by Letters Patent is:

1. A hydraulic weighing scale comprising, a chambered base adapted to rest on the ground and having upstanding side walls, angled top plates secured in spaced relation on said side walls and having upstanding guide flanges at their inner ends, a load member vertically slidably mounted between said side walls and the end flanges of said top plates and laterally retained thereby, tongues on the bottom of said load member underlying said top plates, limit screws threaded through said top plates and adjustably limiting upward movement of said load member, a first plate removably supported in the bottom of said base between said side walls and end plates and having a plurality of longitudinally extending upwardly opening grooves formed in its top, a pressure tube extending longitudinally through each groove, a retaining plate secured to the top of said first plate and having a plurality of longitudinal slots formed therein and opening at longitudinally spaced points to said tubes, said tubes being formed of flexible but relatively non-expansible stainless steel material and having a flat oval cross section within said grooves, said cross section being about three times wider than its thickness and having curved top and bottom walls of a radius of the order of one inch and side edges of smaller radius of the order of one sixteenth of an inch, said grooves having greater dimensions than the maximum cross section of said tubes, generally cylindrical end portions on said tubes positioned exteriorly of said grooves, nesting tapered male and female threaded couplings sealingly clamped to the ends of said tubes, a header in one end of said base connected to the adjacent couplings of said tubes and affording communication therebetween, a reservoir positioned above said header and communicating therewith, an outwardly seating valve connected between said header and said reservoir, manually operable means for unseating said valve, a hydraulic pressure gage in the opposite end of said base from said header and having a weight calibrated dial, means connecting said gage to one of said couplings, means closing the ends of the tubes not connected to said gage and header, pressure surfaces on the bottom of said load member, pressure bars positioned in said slots and having flat top and bottom surfaces bearing between said pressure surfaces and said tubes, and a body of silicone oil liquid having a low coefficient of expansion completely filling said gage, said tubes, said header and the connections therebetween.

2. A hydraulic weighing scale comprising, a chambered base adapted to rest on the ground and having upstanding side walls, angled top plates secured in spaced relation on said side walls, a load member vertically slidably mounted between said side walls and said top plates and laterally retained thereby, tongues on the bottom of said load member underlying said top plates, limit screws threaded through said top plates and adjustably limiting upward movement of said load member, a first plate removably supported in the bottom of said base between said side walls and end plates and having a plurality of longitudinally extending upwardly opening grooves formed in its top, a pressure tube extending longitudinally through each groove, a retaining plate secured to the top of said first plate and having a plurality of longitudinal slots formed therein and opening at longitudinally spaced points to said tubes, said tubes being formed of flexible but relatively non-expansible material and having a flat oval cross section within said grooves, said cross section being about three times wider than its thickness and having curved top and bottom walls of a radius of the order of one inch and side edges of smaller radius of the order of one sixteenth of an inch, said grooves having greater dimensions than the maximum cross section of said tubes, generally cylindrical end portions on said tubes positioned exteriorly of said grooves, nesting tapered male and female threaded couplings sealingly clamped to the ends of said tubes, a header in one end of said base connected to the adjacent couplings of said tubes and affording communication therebetween, a hydraulic pressure gage in the opposite end of said base from said header and having a weight calibrated dial, means connecting said gage to one of said couplings, means closing the ends of the tubes not connected to said gage and header, pressure surfaces on the bottom of said load member, pressure bars positioned in said slots and having flat top and bottom surfaces bearing between said pressure surfaces and said tubes, and a body of liquid having a low coefficient of expansion completely filling said gage, said tubes, said header and the connections therebetween.

3. A hydraulic weighing scale comprising, a chambered base adapted to rest on the ground and having upstanding side walls, top plates secured in spaced relation on said side walls, a load member vertically slidably mounted between said side walls and said top plates and laterally retained thereby, tongues on the bottom of said load member underlying said top plates limiting upward movement of said load member, a first plate removably supported in the bottom of said base between said side walls and end plates and having a plurality of longitudinally extending upwardly opening grooves formed in its top, a pressure tube extending longitudinally through each groove, a retaining plate secured to the top of said first plate and having a plurality of longitudinal slots formed therein and opening to said tubes, said tubes being formed of flexible but relatively non-expansible material and having an oval cross section within said grooves, said cross section having curved top and bottom walls of a relatively long radius and side edges of relatively smaller radius, said grooves being wider than the maximum width of said tubes, generally cylindrical end portions on said tubes positioned exteriorly of said grooves, couplings sealingly clamped to the ends of said tubes, a header in one end of said base connected to the adjacent couplings of said tubes and affording communication therebetween, a reservoir positioned above said header and communicating therewith, an outwardly seating valve connected between said header and said reservoir, manually operable means for unseating said valve, a hydraulic pressure gage in the opposite end of said base from said header and having a weight calibrated dial, means connecting said gage to one of said couplings, means closing the ends of the tubes not connected to said gage and header, pressure surfaces on the bottom of said load member, pressure bars positioned in said slots and having top and bottom surfaces bearing between said pressure surfaces and said tubes, and a body of liquid having a low coefficient of expansion completely filling said gage, said tubes, said header and the connections therebetween.

4. A hydraulic weighing scale comprising, a chambered base adapted to rest on the ground and having upstanding side walls, top plates secured in spaced relation on said side walls, a load member vertically slidably mounted between said side walls and said top plates and laterally retained thereby, tongues on the bottom of said load member underlying said top plates limiting upward movement of said load member, a first plate removably supported in the bottom of said base between said side walls and end plates and having a plurality of longitudinally extending upwardly opening grooves formed in its top, a pressure tube extending longitudinally through each groove, a retaining plate secured to the top of said first plate and having a plurality of longitudinal slots formed therein and opening to said tubes, said tubes being formed of flexible but relatively non-expansible material and having an oval cross section within said grooves, said cross section having curved top and bottom walls of a relatively long radius and side edges of relatively smaller radius, said grooves being wider than the maximum width of said tubes, generally cylindrical end portions on said tubes positioned exteriorly of said grooves, couplings sealingly clamped to the ends of said tubes, a header in one end of said base connected to the adjacent couplings of said tubes and affording communication therebetween, a hydraulic pressure gage in the opposite end of said base from said header and having a weight calibrated dial, means connecting said gage to one of said couplings, means closing the ends of the tubes not connected to said gage and header, pressure surfaces on the bottom of said load member, pressure bars positioned in said slots and having top and bottom surfaces bearing between said pressure surfaces and said tubes, and a body of liquid having a low coefficient of expansion completely filling said gage, said tubes, said header and the connections therebetween.

5. A hydraulic weighing scale comprising, a chambered base adapted to rest on the ground and having upstanding side walls, a load member vertically slidably mounted between said side walls and laterally retained thereby, a first plate removably supported in the bottom of said base between said side walls and having a plurality of longitudinally extending upwardly opening grooves formed in its top, a pressure tube extending longitudinally through each groove, a plate secured to the top of said first plate and having a plurality of longitudinal slots formed therein and opening at longitudinally spaced points to said tubes, said tubes being formed of flexible but relatively non-expansible material and having an oval cross section within said grooves, said cross section having curved top and bottom walls of relatively long radius and side edges of relatively smaller radius, said grooves being wider than the width of said tubes, couplings sealingly clamped to the ends of said tubes, a header in one end of said base connected to said tubes and affording communication therebetween, a hydraulic pressure gage in the opposite end of said base from said header and having a weight calibrated dial, means connecting said gage to one of said couplings, means closing the ends of the tubes not connected to said gage and header, pressure surfaces on the bottom of said load member, pressure bars positioned in said slots and having top and bottom surfaces bearing between said pressure surfaces and said tubes, and a body of liquid having a low coefficient of expansion completely filling said gage, said tubes, said header and the connections therebetween.

6. A hydraulic weighing scale comprising, a chambered base adapted to rest on the ground and having upstanding side walls, a load member vertically slidably mounted between said side walls and laterally retained thereby, a first plate removably supported in the bottom of said base between said side walls and having a plurality of longitudinally extending upwardly opening grooves formed in its top, a pressure tube extending longitudinally through each groove, a plate secured to the top of said first plate and having a plurality of longitudinal slots formed therein and opening to said tubes, said tubes being formed of flexible but relatively non-expansible material and having an oval cross section within said grooves, said cross section having curved top and bottom walls of relatively long radius and side edges of relatively smaller radius, said grooves being wider than the width of said tubes, couplings sealingly clamped to the ends of said tubes, a header in one end of said base connected to said tubes and affording communication therebetween, a hydraulic pressure gage in said base and having a weight calibrated dial, means connecting said gage to one of said couplings, means closing the ends of the tubes not connected to said gage and header, pressure surfaces on the bottom of said load member, pressure bars positioned in said slots and having top and bottom surfaces bearing between said pressure surfaces and said tubes, and a body of liquid having a low coefficient of expansion completely filling said gage, said tubes, said header and the connections therebetween.

7. A hydraulic weighing scale comprising, a chambered base adapted to rest on the ground and having upstanding side walls, a load member vertically slidably mounted between said side walls and laterally retained thereby, a first plate removably supported in the bottom of said base between said side walls and having a plurality of longitudinally extending upwardly opening grooves formed in its top, a pressure tube extending longitudinally through each groove, a plate secured to the top of said first plate and having a plurality of longitudinal slts formed therein and opening at longitudinally spaced points to said tubes, said tubes being formed of flexible but relatively non-expansible material and having a generally oval cross section within said grooves, said cross section being wider than its thickness and having at least one convexly curved horizontal wall, said grooves being wider than the width of said tubes, couplings sealingly clamped to the ends of said tubes, a header in one end of said base connected to the adjacent couplings of said tubes and affording communication therebetween, a hydraulic pressure gage in the opposite end of said base from said header and having a weight calibrated dial, means connecting said gage to one of said tubes, means closing the ends of the tubes not connected to said gage and header, pressure surfaces on the bottom of said load member, pressure bars positioned in said slots and having top and bottom surfaces bearing between said pressure surfaces and said tubes, and a body of liquid having a low coefficient of expansion completely filling said gage, said tubes, said header and the connections therebetween.

8. A hydraulic weighing scale comprising, a chambered base adapted to rest on the ground and having upstanding side walls, a load member vertically slidably mounted between said side walls and laterally retained thereby, a first plate removably supported in the bottom of said base between said side walls and having a plurality of longitudinally extending upwardly opening grooves formed at its top, a pressure tube extending longitudinally through each groove, a plate secured to the top of said first plate and having a plurality of longitudinal slots formed therein and opening to said tubes, said tubes being formed of flexible but relatively non-expansible material and having a flattened cross section within said grooves, said cross section being wider than its thickness and having at least one convexly curved horizontal wall, said grooves being wider than the width of said tubes, couplings sealing clamped to the ends of said tubes, means in one end of said base affording communication between said tubes, a hydraulic pressure gage in said base having a weight calibrated dial, means connecting said gage to one of said tubes, means closing the ends of the tubes not connected to said gage and to said communication affording means, pressure surfaces on the bottom of said load member, pressure bars positioned in said slots and having top and bottom surfaces bearing between said pressure surfaces and said tubes, and a body of liquid completely filling said gage, said tubes and the connections therebetween.

9. A hydraulic weighing scale comprising, a chambered base adapted to rest on the ground and having upstanding side walls, a load member vertically slidably mounted between said side walls and laterally retained thereby, means in the bottom of said base between said side walls forming a plurality of longitudinally extending upwardly opening grooves, a pressure tube extending longitudinally through each groove, a plate secured over said grooves and having a plurality of longitudinal slots formed therein and opening at longitudinally spaced points to said tubes, said tubes being formed of flexible but relatively non-expansible material and having a flattened cross section within said grooves, said cross section being about three times wider than its thickness and having at least one convexly curved horizontal wall, said grooves being wider than said tubes, couplings sealingly engaged with the ends of said tubes, means in one end of said base connected to the adjacent couplings of said tubes and affording communication therebetween, a hydraulic pressure gage having a weight calibrated dial, means connecting said gage to one of said couplings, means closing the ends of the tubes not connected to said gage and said means connecting said couplings, pressure surfaces on the bottom of said load member, pressure bars positioned in said slots and having top and bottom surfaces bearing between said pressure surfaces and said tubes, and a body of liquid having a low coefficient of expansion completely filling said gage, said tubes, and the connections therebetween.

10. A hydraulic weighing scale comprising, a chambered base adapted to rest on the ground and having upstanding side walls, a load member vertically slidably mounted between said side walls and laterally retained thereby, means in the bottom of said base between said side walls forming a plurality of longitudinally extending upwardly opening grooves, a pressure tube extending longitudinally through each groove, a plate secured over said grooves and having a plurality of longitudinal slots formed therein and opening to said tubes, said tubes being formed of flexible but relatively non-expansible material and having a flattened cross section within said grooves, said cross section being wider than its thickness and having at least one convexly curved horizontal wall, said grooves being wider than said tubes, couplings sealingly engaged with the ends of said tubes, means connected to the adjacent couplings of said tubes and affording communication therebetween, a hydraulic pressure gage having a weight calibrated dial, means connecting said gage to one of said couplings, means closing the ends of the tubes not connected to said gage and said means connecting said couplings, pressure surfaces on the bottom of said load member, pressure bars positioned in said slots and having top and bottom surfaces bearing between said pressure surfaces and said tubes, and a body of liquid having a low coefficient of expansion completely filling said gage, said tubes and the connections therebetween.

11. A weighing device adapted to support a load and translate the load into an indication of the weight of the load comprising, a bottom plate having longitudinally extending grooves in the top thereof, a plurality of pressure tubes extending through said grooves, a retaining plate secured to the top of said bottom plate over said tubes, said tubes being of flexible but relatively non-expansible material and having an oval cross section within said grooves spaced from the side walls of the grooves, said cross section having convex top and bottom walls of relatively large radius and convex sides of relatively small radius, said retaining plate having guide slots formed therein longitudinally over said tubes and at longitudinally spaced positions therealong, pressure bars guidingly positioned in said slots and having flat undersurfaces resting on said tubes to support a load, couplings sealed to the ends of said tubes, a header affording communication between said tubes at one end of the tubes, a reservoir having an outwardly seating manually opened spring pressed valve connected to said tubes through said header, a liquid pressure gage connected to the other end of one of said tubes, plugs closing the other ends of the others of said tubes, and a body of liquid completely filling said gage, said tubes, said header and the connections therebetween.

12. A weighing device adapted to support a load and translate the load into an indication of the weight of the load comprising, a bottom plate having longitudinally extending grooves in the top thereof, a plurality of pressure tubes extending through said grooves, a retaining plate secured to the top of said bottom plate over said tubes, said tubes being of flexible but relatively non-expansible material and having an oval cross section within said grooves spaced from the side walls of the grooves, said cross section having convex top and bottom walls of relatively large radius and convex sides of relatively small radius, said retaining plate having guide slots formed therein longitudinally over said tubes, pressure bars guidingly positioned in said slots and having undersurfaces resting on said tubes to support a load, couplings sealed to the ends of said tubes, a header connected to part of said couplings and affording communication between said tubes at one end of the tubes, a reservoir having an outwardly seating manually opened spring pressed valve connected to said tubes, a liquid pressure gage connected to the other end of one of said tubes, plugs closing the other ends of the others of said tubes, and a body of liquid completely filling said gage, said tubes, said header and the connections therebetween.

13. A weighing device adapted to support a load and translate the load into an indication of the weight of the load comprising, a bottom plate having longitudinally extending grooves in the top thereof, a plurality of pressure tubes extending through said grooves, a guide plate secured to the top of said bottom plate over said tubes, said tubes being of flexible but relatively non-expansible material, and having a flattened cross section within said grooves spaced from the side walls of the grooves, said cross section having at least one convex horizontal wall of relatively large radius and convex sides of relatively small radius, said guide plate having guide slots formed therein longitudinally over said tubes and at longitudinally spaced positions therealong, pressure bars guidingly positioned in said slots and having undersurfaces resting on said tubes to support a load, means affording communication between said tubes, a reservoir having an outwardly seating manually opening spring pressed valve connected to said tubes, a liquid pressure gage connected to one of said tubes, plugs closing the other ends of the tubes not connected to each other and said gage, and a body of liquid completely filling said gage, said tubes and the connections therebetween.

14. A weighing device adapted to support a load and translate the load into an indication of the weight of the load comprising, a bottom plate having longitudinally extending grooves in the top thereof, a plurality of pressure tubes extending through said grooves, a guide plate secured over the tubes, said tubes being of flexible but relatively non-expansible material and having a flattened cross section within said grooves spaced from the side walls of the grooves, said cross section having at least one convex horizontal wall of relatively large radius and convex sides of relatively small radius, said guide plate having guide slots formed therein longitudinally over said tubes, pressure bars guidingly positioned in said slots and having undersurfaces resting on said tubes to support a load, means affording communication between said tubes, a reservoir having an outwardly seating manually opening spring pressed valve connected to said tubes, a liquid pressure gage connected to one of said tubes, plugs closing the other ends of the tubes not connected to each other and said gage, and a body of liquid completely filling said gage, said tubes and the connections therebetween.

15. A weighing device adapted to support a load and translate the load into an indication of the weight of the load comprising, a bottom plate having longitudinally extending grooves in the top thereof, a plurality of pressure tubes extending through said grooves, said tubes being of material that is flexible but relatively non-extensible in the plane of the material and having a flattened cross section between said grooves spaced from the side walls of the grooves, said cross section having at least one convex horizontal wall of relatively large radius and convex sides of relatively small radius, load transmitting means positioned over said tubes and having elongated undersurfaces resting on said tubes to support a load, means laterally retaining and vertically guiding said transmitting means over said tubes, means affording communication between said tubes, a liquid pressure gage connected to said tubes, means closing the ends of said tubes, and a body of liquid completely filling said gage, said tubes and the connections therebetween, said convex walls being the sole load transmitting element between said bottom plate and said load transmitting means and said body of liquid and contacting the part in load transmitting relation therewith in substantially spaced relation to the small radius sides of the tube.

16. A hydraulic scale comprising, slidably interfitting base and load members, a flexible but substantially non-extensible thin walled tubular pressure element interposed between said members, said element having a relatively wide and thin cross section disposed flatwise between said members with one flat wall of the section being outwardly convex between the side edges of its inner surface, one of said members having a locating recess therein receiving said element and of sufficient width to permit lateral expansion of the side edges of the element, means contacting a substantial area of said convex and flatwise wall of said element and in thrust transmitting relation with the other of said members but spaced substantially from the side edges of said element, a constant volume pressure gage connected in a closed system with said element, and a body of liquid having a low coefficient of expansion completely filling said closed system.

17. A hydraulic scale comprising, slidably interfitting base and load members, a flexible but substantially non-extensible thin walled tubular pressure element interposed between said members, said element having a relatively wide and thin cross section disposed flatwise between said members with one flat wall of the section being outwardly convex between the side edges of its inner surface, means contacting a substantial area of said convex and flatwise wall of said element and in thrust transmitting relation with the other of said members but spaced substantially from the side edges of said element, a constant volume pressure gage connected in a closed system with said element, and a body of liquid completely filling said closed system.

18. A hydraulic scale comprising, a base member, a load member, means guiding said members for relative movement toward and away from each other, a hollow tubular pressure element interposed between said members, said element having a relatively wide and thin cross section with thin walls arranged flatwise between said members, said element being formed of resilient material that is substantially nonextensible in the plane of the material, at least one flatwise wall of said element being outwardly convex between the side edges of its inner surface and in contact with a flat area of the adjacent member, in substantially spaced relation to the side edges of the convex wall, a constant volume pressure gage connected to said element and forming a closed system therewith, and a body of liquid completely filling said system.

19. A hydraulic scale comprising, a base member, a load member, means guiding said members for a relative movement toward and away from each other, a hollow pressure element interposed between said members, said element having a relatively wide and thin cross section with thin walls arranged flatwise between said members, said element being formed of resilient material that is substantially nonextensible in the plane of the material, at least one flatwise wall of said element being outwardly convex between the side edges of its inner surface and in contact with a flat area of the adjacent member, in substantially spaced relation to the side edges of the convex wall, a constant volume pressure gage connected to said element and forming a closed system therewith, and a body of liquid completely filling said system.

20. A hydraulic weighing scale comprising, a base member adapted to rest on the ground, a load member vertically movably mounted on said base member, means preventing relative lateral displacement of said members, means in one of said members forming a plurality of longitudinally extending grooves opening toward the other of said members, a plurality of pressure tubes extending through said grooves between said members, said tubes being formed of thin walled resilient material that is substantially nonextensible in the plane of the material and having substantially greater width than thickness and having at least one outwardly convex wall disposed flatwise of said grooves and spaced from the side walls of the grooves, the convex wall being convexly curved between the side edges of its inner surface, elongated load transmitting rails engaged between said tubes and the other of said members, said rails being substantially narrower than said tubes and contacting said convex walls of said tubes in spaced relationship from the side edges of the tubes, means in said base interconnecting said tubes, a constant volume pressure gage connected to said tubes in a closed system, and a body of liquid completely filling said system.

21. A hydraulic weighing scale comprising, a base member adapted to rest on the ground, a load member vertically movably mounted on said base member, means preventing relative lateral displacement of said members, a plurality of pressure tubes extending between said members, said tubes being formed of thin walled resilient material that is substantially nonextensible in the plane of the material and having substantially greater width than thickness and having at least one outwardly convex wall disposed flatwise, the convex wall being convexly curved between the side edges of its inner surface, elongated load transmitting rails engaged between said tubes and one of said members, said rails being substantially narrower than said tubes and contacting said convex walls of said tubes in spaced relationship from the side edges of the tubes, means in said base interconnecting said tubes, a constant volume pressure gage connected to said tubes in a closed system, and a body of liquid completely filling said system, and means for establishing atmospheric pressure in said system prior to weighing operations.

22. A weighing apparatus comprising a base, a platform disposed in opposed vertically spaced relation to the base, a fluid pressure gage, an elongated tubular liquid containing pressure element connected to the gage and disposed between said base and platform to sustain a load on the platform, said pressure element being of relatively wide oval cross section and disposed flatwise upon the base, at least one wall of said element being convex between the side edges of its inner surface, the walls of the pressure element being of flexibly resilient nonextensible material, and an elongated load transmitting bar disposed longitudinally of and centrally upon the pressure element and having its area of contact with the element spaced from the side edges of the element, and means for establishing atmospheric pressure in the system formed by said gage and said pressure element prior to weighing operations.

References Cited in the file of this patent

UNITED STATES PATENTS

| | | |
|---|---|---|
| 136,724 | Hopkins | Mar. 11, 1873 |
| 769,380 | Hicks | Sept. 6, 1904 |
| 1,227,505 | Troll | May 22, 1917 |
| 1,227,506 | Troll | May 22, 1917 |
| 1,329,684 | Troll | Feb. 3, 1920 |
| 1,329,685 | Troll | Feb. 3, 1920 |
| 1,494,164 | Goldbeck | May 13, 1924 |
| 1,844,080 | Troll | Feb. 9, 1932 |
| 2,261,027 | Hopkins | Oct. 28, 1941 |
| 2,323,985 | Fausek et al. | July 13, 1943 |
| 2,408,541 | Wilson | Oct. 1, 1946 |
| 2,415,570 | Ward | Feb. 11, 1947 |
| 2,685,305 | Woods | Aug. 3, 1954 |
| 2,704,661 | Maugh | Mar. 22, 1955 |
| 2,761,043 | Larson | Aug. 28, 1956 |

FOREIGN PATENTS

| | | |
|---|---|---|
| 112,571 | Great Britain | Jan. 17, 1918 |